United States Patent
Hirota et al.

(10) Patent No.: US 10,753,248 B2
(45) Date of Patent: Aug. 25, 2020

(54) EXHAUST GAS PURIFICATION CATALYST

(71) Applicant: Johnson Matthey Public Limited Company, London (GB)

(72) Inventors: Tomotaka Hirota, Tochigi (JP); Yasunori Kurashima, Tochigi (JP); Shuhei Nagaoka, Tochigi (JP); Yukie Ohtsuka, Tochigi (JP); Satoshi Sumiya, Tochigi (JP); Takayuki Suzuki, Tochigi (JP); Takashi Yamada, Tochigi (JP)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/140,653

(22) Filed: Sep. 25, 2018

(65) Prior Publication Data

US 2019/0093531 A1    Mar. 28, 2019

(30) Foreign Application Priority Data

Sep. 26, 2017 (JP) ................. 2017-184290

(51) Int. Cl.
*B01J 23/00* (2006.01)
*B01J 23/10* (2006.01)
(Continued)

(52) U.S. Cl.
CPC ........... *F01N 3/101* (2013.01); *B01D 53/865* (2013.01); *B01D 53/945* (2013.01); *B01J 21/04* (2013.01);
(Continued)

(58) Field of Classification Search
CPC ........ F01N 3/101; F01N 3/2803; B01J 23/63; B01J 35/0006; B01J 23/10; B01J 23/464; B01J 21/10; B01J 21/04; B01D 53/945; B01D 53/865; B01D 2258/014; B01D 2255/407; B01D 2255/2092; B01D 2255/2068; B01D 2255/2066; B01D 2255/2065; B01D 2255/1023; B01D 2255/908; B01D 2255/1025; B01D 2255/702; B01D 2255/502;
(Continued)

(56) References Cited

U.S. PATENT DOCUMENTS

| 4,170,573 A | 10/1979 | Ernest |
| 5,128,306 A * | 7/1992 | Dettling ............... B01D 53/945 |
| | | 423/213.5 |
| 2016/0228853 A1 | 8/2016 | Matsumura |

FOREIGN PATENT DOCUMENTS

| EP | 0393612 | 10/1990 |
| EP | 1563893 B1 | 8/2007 |
| JP | 2014100684 B2 | 6/2014 |

* cited by examiner

*Primary Examiner* — Haytham Soliman
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprises: a substrate; and a catalytic region on the substrate; wherein the catalytic region comprises a platinum group metal (PGM) component, an oxide, and a rare earth metal component; wherein the oxide is an inorganic oxide, an oxygen storage component (OSC) material, or a mixture thereof; wherein the rare earth metal component concentration by element on the surface of the oxide per unit specific surface area of the oxide is 1 μmol/m² to 20 μmol/m².

20 Claims, 5 Drawing Sheets

(51) Int. Cl.
  *F01N 3/10* (2006.01)
  *F01N 3/28* (2006.01)
  *B01J 21/04* (2006.01)
  *B01J 21/10* (2006.01)
  *B01J 23/46* (2006.01)
  *B01J 35/00* (2006.01)
  *B01D 53/86* (2006.01)
  *B01J 23/63* (2006.01)
  *B01D 53/94* (2006.01)

(52) U.S. Cl.
  CPC ............... *B01J 21/10* (2013.01); *B01J 23/10* (2013.01); *B01J 23/464* (2013.01); *B01J 23/63* (2013.01); *B01J 35/0006* (2013.01); *F01N 3/2803* (2013.01); *B01D 2255/1023* (2013.01); *B01D 2255/1025* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/2092* (2013.01); *B01D 2255/407* (2013.01); *B01D 2255/502* (2013.01); *B01D 2255/702* (2013.01); *B01D 2255/908* (2013.01); *B01D 2255/9032* (2013.01); *B01D 2255/9207* (2013.01); *B01D 2257/404* (2013.01); *B01D 2258/01* (2013.01); *B01D 2258/014* (2013.01)

(58) Field of Classification Search
  CPC ...... B01D 2257/404; B01D 2255/9207; B01D 2255/9032; B01D 2255/2061; B01D 2258/01; B01D 2255/2063
  USPC .......................................................... 502/303
  See application file for complete search history.

EXHAUST GAS PURIFICATION CATALYST

FIELD OF THE INVENTION

The present invention relates to a catalyst useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalysts, are widely utilized to reduce the amount of these pollutants emitted to atmosphere. A commonly used catalyst for gasoline engine applications is a three-way catalyst (TWC). TWCs perform three main functions: (1) oxidation of carbon monoxide (CO); (2) oxidation of unburnt hydrocarbons; and (3) reduction of $NO_x$ to $N_2$.

TWC catalysts require careful engine management techniques to ensure that the engine operates at or close to stoichiometric conditions (air/fuel ratio, $\lambda=1$). For technical reasons, however, it is necessary for engines to operate on either side of $\lambda=1$ at various stages during an operating cycle. When the engine is running rich, for example during acceleration, the overall exhaust gas composition is reducing in nature, and it is more difficult to carry out oxidation reactions on the catalyst surface. For this reason, TWCs have been developed to incorporate a component which stores oxygen during leaner periods of the operating cycle, and releases oxygen during richer periods of the operating cycle, thus extending the effective operating window. For such purposes, ceria-based (e.g., ceria-zirconia mixed oxides) materials are used in the vast majority of current commercial TWCs as oxygen storage components (OSC).

Aggregation of precious metal particles is known as one factor that causes deterioration of TWC catalysts used in the purification of gasoline engine exhaust gas. In particular, rhodium is known to increase aggregation rate by transforming to rhodium oxide in high-temperature/oxidizing atmospheres, and aggregation causes the surface area of catalyst activation points to become smaller resulting in a deterioration in catalyst performance.

Despite advances in TWC technology, there remains a need for improved catalytic converters for certain engine platforms that produce high conversion rates with improved thermal stability. This invention solves these needs amongst others.

SUMMARY OF THE INVENTION

One aspect of the present disclosure is directed to a catalyst article for treating exhaust gas comprising: a substrate; and a catalytic region on the substrate; wherein the catalytic region comprises a platinum group metal (PGM) component, an oxide, and a rare earth metal component; wherein the oxide is an inorganic oxide, an oxygen storage component (OSC) material, or a mixture thereof; wherein the rare earth metal component concentration by element on the surface of the oxide per unit specific surface area of the oxide is 1 $\mu mol/m^2$ to 20 $\mu mol/m^2$.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

DETAILED DESCRIPTION OF THE INVENTION

Figure 1:
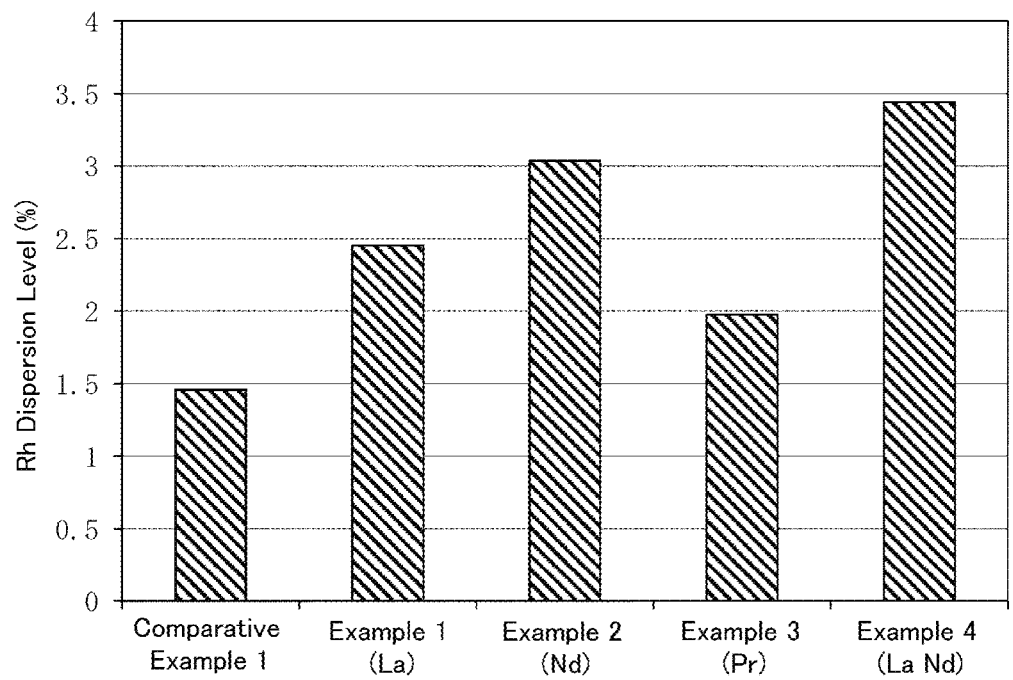
FIG. 1 is a graph showing Rh dispersion level after endurance testing of the exhaust gas purification catalysts of Examples 1-4 and Comparative Example 1.

The present invention is directed to the catalytic treatment of combustion exhaust gas, such as that produced by gasoline and other engines, and to related catalytic articles and systems. More specifically, the invention relates the simultaneous treatment of $NO_x$, CO, and HC in a vehicular exhaust system. Surprisingly, the inventors have discovered that by locating rare earth metal component onto the surface of the oxide support in the catalyst, the catalyst of the present invention demonstrated high thermal durability while maintaining a high level of TWC performance.

One aspect of the present disclosure is directed to a catalyst article for treating exhaust gas comprising: a substrate; and a catalytic region on the substrate; wherein the catalytic region comprises a platinum group metal (PGM) component, an oxide, and a rare earth metal component; wherein the oxide is an inorganic oxide, an oxygen storage component (OSC) material, or a mixture thereof; wherein the rare earth metal component concentration by element on the surface of the oxide per unit specific surface area of the oxide is 1 $\mu mol/m^2$ to 20 $\mu mol/m^2$.

Preferably, the rare earth metal component concentration by element on the surface of the oxide per unit specific surface area of the oxide is 1.5 $\mu mol/m^2$ to 19 $\mu mol/m^2$; more preferably, the rare earth metal component concentration by element on the surface of the oxide per unit specific surface area of the oxide is 1.8 $\mu mol/m^2$ to 18 $\mu mol/m^2$; most preferably, the rare earth metal component concentration by element on the surface of the oxide per unit specific surface area of the oxide is 2 $\mu mol/m^2$ to 15 $\mu mol/m^2$.

By having the rare earth metal element present on the surface layer of the oxide in the above concentration, aggregation of the PGM (e.g., Rh) particles can be suppressed and the dispersion level of the PGM (e.g., Rh) particles can be improved even after endurance testing.

If the concentration level of the rare earth metal element on the surface of the oxide exceeds 20 $\mu mol/m^2$, there is a possibility that the rare earth metal component (e.g., Nd) particles move during endurance testing, the frequency of collisions and associations between the rare earth metal component (e.g., Nd) particles increases and the effect against PGM (e.g., Rh) aggregation decreases.

By concentrating the rare earth metal element on the surface layer of the oxide, PGM oxide produced in a high-temperature/oxidizing atmosphere is destabilized/decomposed, and by being returned to PGM particles, even after endurance testing, the PGM dispersion level is improved, and the activity of the exhaust gas purification catalyst is improved.

The rare earth metal component is not limited in particular, and can be selected from the group consisting of La, Ce, Pr, Nd, Pm, Sm, Eu, Gd, Tb, Dy, Ho, Er, Tm, Yb, Lu, Sc, Y, and a mixture thereof. Preferably, the rare earth metal component is selected from the group consisting of La, Pr, Nd, and a mixture thereof and more preferably, is Nd.

The same effects can be obtained whether using a combination of two rare earth elements, such as the combinations La—Nd, Pr—Nd, and La—Pr, or using a combination of three rare earth elements, such as the combination La—Pr—Nd. In particular, in the La—Nd combination, La and Nd form composite particles, by which La and Nd become more stable than when used alone, aggregation of composite particles is suppressed, and La and Nd can be concentrated on the surface layer of the oxide more evenly, and further, decomposition of rhodium oxide particles can be promoted due to the interaction with the rhodium particles, that is different from when La and Nd are used alone.

The PGM is preferably selected from the group consisting of palladium, platinum, rhodium, and mixtures thereof. Particularly preferably, the PGM is rhodium.

The catalytic region preferably comprises 0.1 to 10 weight percent of the PGM, more preferably 0.2 to 7 weight percent of the PGM, and most preferably 0.3 to 4 weight percent of the PGM, based on the total weight of the catalytic region.

In the embodiments where the PGM is rhodium, the catalytic region preferably comprises 0.1 to 10 weight percent of rhodium, more preferably 0.2 to 7 weight percent of rhodium, and most preferably 0.3 to 4 weight percent of rhodium, based on the total weight of the catalytic region.

PGM component can be supported on the surface layer of the oxide. In embodiments where PGM component is supported on the surface layer of the OSC material, the catalytic region may further comprise an inorganic oxide, wherein the inorganic oxide may not be part of the support for the PGM component. In embodiments where PGM component is supported on the surface layer of the inorganic oxide, the catalytic region may further comprise an OSC material, wherein the OSC material may not be part of the support for the PGM component.

In the embodiments where the oxide is the OSC material, the OSC material is preferably selected from the group consisting of cerium oxide, a ceria-zirconia mixed oxide, a ceria-zirconia composite oxide, a composite oxide comprising Ce, Zr, and a rare earth element, and an alumina-ceria-zirconia mixed oxide. The ceria-zirconia mixed oxide or composite oxide can have a molar ratio of zirconia to ceria from 9:1 to 1:9; preferably, from 8:2 to 2:8; more preferably, from 7:3 to 3:7. In some embodiments, the rear earth element in the composite oxide comprising Ce and Zr can be La and/or Y. The OSC material can be in the range of 20-80%, based on the total weight of the catalytic region.

When the oxide is the OSC material and when the PGM (e.g., Rh) loading is at least 1%, 2%, or 3%, based on the total weight of the catalytic region, the PGM dispersion can be at least 2%, preferably at least 2.5% after aging at 1000° C. for 20 hours under redox conditions. In certain embodiments, the mean PGM (e.g., Rh) particle size can be less than 70 nm; preferably, less than 50 nm; more preferably, less than 40 nm.

When the oxide is the OSC material and when the PGM loading is less than 1%, 0.9%, 0.8%, 0.7%, or 0.6%, based on the total weight of the catalytic region, the PGM dispersion can be at least 6%, preferably at least 7% or 8%, after aging at 1000° C. for 20 hours under redox conditions. In certain embodiments, the mean PGM (e.g., Rh) particle size can be less than 20 nm; preferably, less than 18 nm; more preferably, less than 16 nm.

In the embodiments where the oxide is the inorganic oxide, the inorganic oxide can be an oxide of Groups 2, 3, 4, 5, 13 and 14 elements. Preferably, the inorganic oxide is selected from the group consisting of alumina, lanthanide-stabilized alumina, alkaline earth stabilized alumina, silica, aluminosilicates, a magnesia/alumina composite oxide, titania, niobia, tantalum oxides, neodymium oxide, yttrium oxide, lanthanides, and mixed oxides or composite oxides thereof. More preferably, the inorganic oxide is alumina, a lanthanide-stabilized alumina, or a magnesia/alumina composite oxide.

When the oxide is the inorganic oxide and when the PGM loading is at least 1%, 2%, or 3%, based on the total weight of the catalytic region, the PGM dispersion can be at least 3%, preferably at least 4%, 5%, or 6%, after aging at 1000° C. for 20 hours under redox conditions. In certain embodiments, the mean PGM (e.g., Rh) particle size can be less than 40 nm; preferably, less than 30 nm; more preferably, less than 25 nm.

The catalytic region may further comprise an alkali or alkali earth metal. In some embodiments, the alkali or alkali earth metal may be deposited on the OSC material. Alternatively, or in addition, the alkali or alkali earth metal may be deposited on the inorganic oxide. That is, in some embodiments, the alkali or alkali earth metal may be deposited on, i.e. present on, both the OSC material and the inorganic oxide.

The alkali or alkali earth metal is preferably barium or strontium. More preferably, the barium, where present, is less than 30%; most preferably, less than 20%; based on the total weight of the catalytic region.

The total washcoat loading of the catalytic region can be 0.1-5 g/in$^3$, preferably, 0.5-4 g/in$^3$; more preferably, 1-3 g/in$^3$; most preferably, 1.5-2.5 g/in$^3$.

The catalytic region may further comprise a second PGM component.

The second PGM is preferably selected from the group consisting of palladium, platinum, rhodium, and a mixture thereof. Particularly preferably, the second PGM component is Pd or Pt if the PGM component is Rh.

In certain embodiments, the catalytic region is essentially free of PGM metals other than the Rh component.

The catalytic region of the invention may comprise further components that are known to the skilled person. For example, the compositions of the invention may further comprise at least one binder and/or at least one surfactant. Where a binder is present, dispersible alumina binders are preferred.

The substrate can be a metal or ceramic substrate. Preferably the substrate is a flow-through monolith or a filter monolith.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

The substrate may be an electrically heatable substrate (i.e. a substrate that can be heated by applying electricity, in use). When the substrate is an electrically heatable substrate, the catalyst article of the invention comprises an electrical power connection, preferably at least two electrical power connections, more preferably only two electrical power connections. Each electrical power connection may be electrically connected to the electrically heatable substrate and an electrical power source. The catalyst article can be heated by Joule heating, where an electric current through a resistor converts electrical energy into heat energy.

In general, the electrically heatable substrate comprises a metal. The metal may be electrically connected to the electrical power connection or electrical power connections.

Typically, the electrically heatable substrate is an electrically heatable honeycomb substrate. The electrically heatable substrate may be an electrically heating honeycomb substrate, in use.

The electrically heatable substrate may comprise an electrically heatable substrate monolith (e.g. a metal monolith). The monolith may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable substrate, the metal monolith and/or the corrugated metal sheet or foil may comprise an aluminium ferritic steel, such as Fecralloy™.

The catalysts of the invention may be prepared by any suitable means. For example, the catalyst may be prepared by mixing first PGM, an optional first alkali or alkali earth metal or second PGM, an inorganic oxide, an OSC material and a rare earth metal oxide in any order. The manner and order of addition is not considered to be particularly critical. For example, each of the components of the catalyst may be added to any other component or components simultaneously, or may be added sequentially in any order. Each of the components of the catalyst may be added to any other component of the catalyst by impregnation, adsorption, ion-exchange, incipient wetness, precipitation, or the like, or by any other means commonly known in the art.

Preferably, the catalyst as hereinbefore described is prepared by depositing the catalyst on the substrate using washcoating procedures. A representative process for preparing the catalyst using a washcoat procedure is set forth below. It will be understood that the process below can be varied according to different embodiments of the invention.

The washcoating is preferably performed by first slurrying finely divided particles of the components of the catalyst as hereinbefore defined in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers, binders, surfactants or promoters, may also be incorporated in the slurry as a mixture of water soluble or water-dispersible compounds or complexes.

The substrate may then be coated one or more times with the slurry such that there will be deposited on the substrate the desired loading of the catalyst.

The method for producing the exhaust gas purification catalyst according to the present embodiment includes concentrating, in the presence of the oxide, a rare earth element on the surface layer of the oxide using an acidic solution which includes rare earth element ions. Concentrating a rare earth element on the surface layer of an oxide can be performed, in the presence of the oxide, using an acidic solution which includes rare earth element ions. Concentrating a rare earth element on the surface layer of an oxide can be performed using a publicly-known technique such as, for example, a precipitation method, an impregnation method, a coprecipitation method, etc. For example, concentrating a rare earth element on the surface layer of an oxide may be performed by adding, to a slurry of the oxide which has been mixed with water to form a slurry, an acidic solution including rare earth element ions, and then adding an alkali solution to precipitate a rare earth salt onto the oxide or by impregnating the oxide in an acidic solution including rare earth element ions. When precipitating the rare earth salt by adding the alkali solution, a pH of 7-8 is preferable. The concentration of rare earth element ions in the acidic solution can be adjusted as appropriate in accordance with the desired concentration of the rare earth element on the surface layer of the oxide. The acidic solution including rare earth element ions is not limited in particular and a nitric acid aqueous solution, a hydrochloric acid aqueous solution, etc. including rare earth element ions may be used.

The oxide on which the surface layer thereof a rare earth element has been concentrated is processed into a powdery form by performing washing, drying, and firing steps, as appropriate, and furthermore, rhodium is supported on the oxide in a powdery form by using a publicly-known technique such as a precipitation method, an impregnation method, a coprecipitation method, etc., and a rhodium supported rare earth element surface layer concentrated oxide powder is obtained by performing drying and firing steps as appropriate. The rhodium supported rare earth element surface layer concentrated oxide is then applied in a commercially available honeycomb carrier, etc., which is the substrate of an exhaust gas purification catalyst. The rhodium supported rare earth element surface layer concentrated oxide powder is formed into a slurry and coated on a honeycomb carrier using, for example, a conventionally-known washcoat method, and an exhaust gas purification component is obtained by performing drying and firing steps as appropriate.

Another aspect of the present disclosure is directed to a method for treating a vehicular exhaust gas containing $NO_x$, CO, and HC using the catalyst article described herein. Catalytic converters equipped with TWC made according to this method show improved catalytic performance compared to conventional TWC.

Another aspect of the present disclosure is directed to a system for treating vehicular exhaust gas comprising the catalyst article described herein in conjunction with a conduit for transferring the exhaust gas through the system.

The system can comprise a second catalyst article. Preferably, the second catalyst article can comprise a gasoline particulate filter (GPF) or a TWC. More preferably, the second catalyst article is placed downstream of the first catalyst article.

The TWC catalyst can be any conventional TWC catalyst.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The "PGM dispersion (%)" means the ratio of the number of atoms located at surface of the PGM materials (e.g., particle) to total number of atoms of the PGM materials loaded on oxide support materials. The number of atoms located at surface can be measured by conventional and publicly-known gas adsorption method (e.g., CO pulsed adsorption). In the present specification, the PGM dispersion was calculated by division of number of the surface atoms, measured by CO pulsed adsorption with the assumption of one PGM atom at surface can adsorb oneCO molecule, by total number of PGM atoms loaded on the oxide materials.

The "mean particle size" means the mean diameter of the particle with the assumption that a sphere shape of the PGM particles is supported on the oxide materials. The mean particle size can be calculated with the data of PGM dispersion, which is representing the ratio of the surface atoms to total atoms, and volumetric mass density of the corresponding PGM bulk materials.

The "specific surface area ($m^2/g$)" of the oxide materials may be measured using conventional and publicly-known gas adsorption method based on Brunauer-Emmett-Teller (BET) theory, etc. in the present specification, the values of specific surface area were obtained by adsorption of nitrogen gas with BET theory. The specific surface area of the materials may potentially change before and after the endurance test mentioned below, and in the present specification, the "specific surface area" means the specific surface area of the oxide materials after the endurance testing mentioned below.

The concentration level ($\mu mol/m^2$) of the rare earth element concentrated on the surface layer of the oxide means the coverage of amount of substance (mol) of rare earth element on the unit specific surface area ($1/m^2$) of the oxide materials. (the amount of the rare earth element introduced as a raw material). The concentration level of the rare earth element concentrated on the oxide surface layer, regardless of before or after the use of the catalyst, may be confirmed by a quantitative analysis of the element concentration ratio in the oxide surface layer using, for example, a publicly-known analysis method such as XPS, etc.

Endurance testing indicates a test, before the catalyst is dispatched as a product, for reproducing the deterioration state of an exhaust gas purification catalyst in actual use, and is generally a test performed by exposing the catalyst for 20 hours in environments which alternate between oxidation and reduction atmospheres at temperatures of at least 1000° C.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

"PGM component is supported on the surface layer of the oxide" means not only the situation in which almost the entirety of the PGM (e.g., rhodium) particles are exposed and supported on the surface layer of the oxide, but also the situation in which only some of the PGM (e.g., rhodium) particles are exposed and supported on the surface layer of the oxide.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The term "redox" as used herein refers to gas mixtures alternating between reducing atmosphere and oxidizing atmosphere.

The following examples merely illustrate the invention. Those skilled in the art will recognize many variations that are within the spirit of the invention and scope of the claims.

EXAMPLES

Example 1: Rhodium Supported Lanthanum Surface Layer Concentrated Composite Oxide Catalyst A composite oxide comprising Ce, Zr, La, and Y (wherein the composition, by weight ratio, is $CeO_2:ZrO_2:La_2O_3:Y_2O_3=20:65:5:10$) was mixed with water and made into a slurry having a solid content of approximately 25% by weight. To the slurry, a lanthanum nitrate aqueous solution, prepared so as to support 5 $\mu mol/m^2$ of lanthanum with respect to the specific surface area of the composite oxide after endurance testing, was added, and then aqueous ammonia was dripped, a lanthanum salt was precipitated, and lanthanum was concentrated on the surface layer of the composite oxide. The slurry was dried in air at 150° C. for 5 hours, and then fired at 600° C. for 2 hours, by which a lanthanum surface layer concentrated composite oxide powder was obtained.

A nitric acid rhodium aqueous solution, prepared so that the amount of Rh added was 3% by weight was impregnated in the lanthanum surface layer concentrated composite oxide powder, and after being dried in air at 150° C. for 2 hours was then fired at 600° C. for 2 hours, by which a rhodium supported lanthanum surface layer concentrated composite oxide was obtained. The rhodium supported lanthanum surface layer concentrated composite oxide was mixed with a binder and water to form a slurry, and coated on a honeycomb carrier. After that, by firing in air at 600° C. for 2 hours, the rhodium supported lanthanum surface layer concentrated composite oxide catalyst according to Example 1 was obtained. For the honeycomb carrier, a cordierite carrier having a cell wall thickness of 4.0 mil with 400 cells per square inch was used. The amount of rhodium supported in the catalyst was 90 g per 1 L of the carrier. The result of measuring the specific surface area of the composite oxide by the BET method using TriStar II (manufactured by Micromeritics Instrument Corp.) after the hydrothermal redox endurance testing, which is mentioned below, was approximately 40 $m^2/g$.

Example 2: Rhodium Supported Neodymium Surface Layer Concentrated Composite Oxide Catalyst The rhodium supported neodymium surface layer concentrated composite oxide catalyst according to Example 2 was produced by the same method as Example 1 except that a nitric acid neodymium aqueous solution was used instead of the nitric acid lanthanum aqueous solution.

Example 3: Rhodium Supported Praseodymium Surface Layer Concentrated Composite Oxide Catalyst The rhodium supported praseodymium surface layer concentrated composite oxide catalyst according to Example 3 was produced by the same method as Example 1 except that a nitric acid praseodymium aqueous solution was used instead of the nitric acid lanthanum aqueous solution.

Example 4: Rhodium Supported Lanthanum-Neodymium Surface Layer Concentrated Composite Oxide Catalyst The rhodium supported lanthanum-neodymium surface layer concentrated composite oxide catalyst according to Example 4 was produced by the same method as Example 1 except that for the slurry, instead of the nitric acid lanthanum aqueous solution, an aqueous solution was used in which were mixed a nitric acid lanthanum aqueous solution and a nitric acid neodymium aqueous solution that had been prepared so that 2.5 $\mu mol/m^2$ of lanthanum and neodymium were supported, respectively, for the specific surface area of the composite oxide after endurance testing.

Example 5: Rhodium Supported Neodymium Surface Layer Concentrated Composite Oxide Catalyst The rhodium supported neodymium surface layer concentrated composite oxide catalyst according to Example 5 was produced by the same method as Example 1 except that a nitric acid neodymium aqueous solution was used instead of the nitric acid lanthanum aqueous solution, but six catalysts were produced in which the neodymium concentration on the composite oxide surface layer, with respect to the specific surface area of the composite oxide after endurance testing was 0 $\mu mol/m^2$, 2 $\mu mol/m^2$, 5 $\mu mol/m^2$, 10 $\mu mol/m^2$, 15 $\mu mol/m^2$, and 20 $\mu mol/m^2$.

Example 6: Rhodium Supported Neodymium Surface Layer Concentrated Lanthanum Stabilized Aluminum Oxide Catalyst The rhodium supported neodymium surface layer concentrated lanthanum stabilized aluminum oxide catalyst according to Example 6 was produced by the same method as Example 1 except that instead of a composite oxide comprising Ce, Zr, La, and Y, a lanthanum stabilized aluminum oxide was used, but six catalysts were produced in which the neodymium concentration on the lanthanum stabilized aluminum oxide surface layer was 0 µmol/m$^2$, 2 µmol/m$^2$, 5 µmol/m$^2$, 10 µmol/m$^2$, 15 µmol/m$^2$, and 20 µmol/m$^2$.

Example 7: Fully Formulated Pd—Rh Three-Way Catalyst with Rh Supported on Neodymium Surface Layer Concentrated Composite Oxide Example 7 was prepared according to the present invention. The bottom layer consists of Pd supported on a washcoat of a first CeZr mixed oxide, La-stabilized alumina, Ba promotor. The washcoat loading of the bottom layer was about 1.6 g/in$^3$ with a Pd loading of 90 g/ft$^3$. The top layer consists of Rh supported on a washcoat of a second CeZr mixed oxide with Nd surface enrichment of 2 µmol/m$^2$, La-stabilized alumina. The washcoat loading of the top layer was about 2.0 g/in$^3$ with a Rh loading of 10 g/ft$^3$. The total washcoat loading of Example 7 was about 3.6 g/in$^3$.

Comparative Example 1: Rhodium Supported Composite Oxide Catalyst

The rhodium supported composite oxide catalyst according to Comparative Example 1 was produced by the same method as Example 1 except that a rare earth element was not concentrated on the surface layer of the composite oxide.

Comparative Example 2: Rhodium Supported Lanthanum Stabilized Aluminum Oxide Catalyst The catalyst according to Comparative Example 2 was produced by the same method as Comparative Example 1 except that instead of the composite oxide comprising Ce, Zr, La, and Y, a lanthanum stabilized aluminum oxide was used.

Comparative Example 3: Full Formulated Pd—Rh Three-Way Catalyst with Rh Supported on Composite Oxide Comparative Example 3 is a three-way (Pd—Rh) catalyst with a double-layered structure. The bottom layer consists of Pd supported on a washcoat of a first CeZr mixed oxide, La-stabilized alumina, Ba promotor. The washcoat loading of the bottom layer was about 1.6 g/in$^3$ with a Pd loading of 90 g/ft$^3$. The top layer consists of Rh supported on a washcoat of a second CeZr mixed oxide, La-stabilized alumina. The washcoat loading of the top layer was about 2.0 g/in$^3$ with a Rh loading of 10 g/ft$^3$. The total washcoat loading of Comparative Example 3 was about 3.6 g/in$^3$.

Experimental Results

Hydrothermal Redox Endurance Testing:

Hydrothermal redox endurance tests at 1000° C. for 20 hours were conducted on the catalysts of Examples 1-6 and Comparative Examples 1 and 2. Hydrothermal redox endurance testing involves, using the oxidizing atmosphere and reducing atmosphere gases which have the compositions shown in Table 1, exposing the catalysts in three-minute intervals alternating between oxidizing and reducing atmospheres, and evaluating the dispersion level of the rhodium particles after endurance testing. The hydrothermal redox endurance testing of the present examples reproduces the deterioration state of the exhaust gas purification catalyst in actual use.

TABLE 1

| | H$_2$ (%) | CO (%) | O$_2$ (%) | H$_2$O (%) | N$_2$ |
|---|---|---|---|---|---|
| Oxidizing Atmosphere Gas | 0 | 0 | 3 | 10 | Balance |
| Reduction Atmosphere Gas | 3 | 3 | 0 | 10 | Balance |

The dispersion level of the rhodium particles (hereafter referred to as "Rh dispersion") means, among the atoms constituting the rhodium particles, the ratio of rhodium atoms which are present on the surface of the particles to the total rhodium material loaded on the oxide support. The quantity of rhodium atoms on the surface is determined by measuring the amount of gas that the rhodium particles adsorb, and is evaluated using a pulse adsorption method which utilizes CO gas. The pulse adsorption method is a method for calculating dispersion level on the basis of the content of metal species and metals, by introducing to the test specimen a fixed amount of gas in repeating pulses and setting as the adsorption amount the total differential between amount of gas introduced and amount discharged, wherein the higher the dispersion level value, the higher the ratio of metal present in the surface layer of the particles.

As shown in FIG. 1, compared to the catalyst in Comparative Example 1, all of the catalysts in Examples 1-4 had an improved rhodium particle dispersion level after hydrothermal redox endurance testing. That is, it is understood that, irrespective of the kind of rare earth element, by concentrating a rare earth element on the surface layer of a composite oxide, rhodium aggregation is suppressed, and rhodium particle dispersion level after endurance testing is improved. In particular, when neodymium was concentrated on the surface layer of the composite oxide (Example 2), and when lanthanum and neodymium were concentrated on the surface layer of the composite oxide (Example 4), the effect of improving Rh dispersion was high.

It can be said that the activity and high-temperature endurance of the catalyst improved due to the improved rhodium particle dispersion level after endurance testing.

Figure 2:
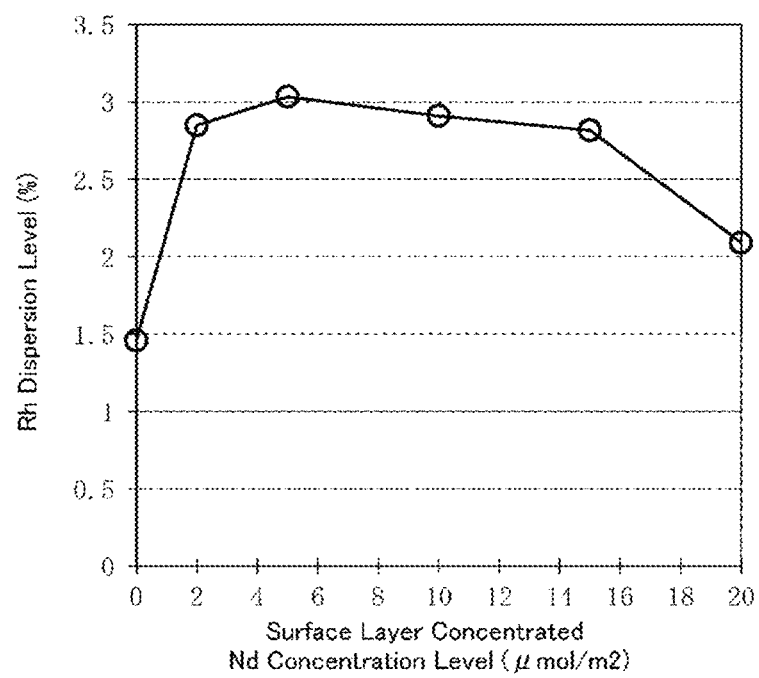
FIG. 2 shows the relationship between Rh dispersion level and the concentration level of surface layer concentrated Nd on ceria-zirconia composite oxide after endurance testing of the exhaust gas purification catalyst of Example 5.
Figure 3:
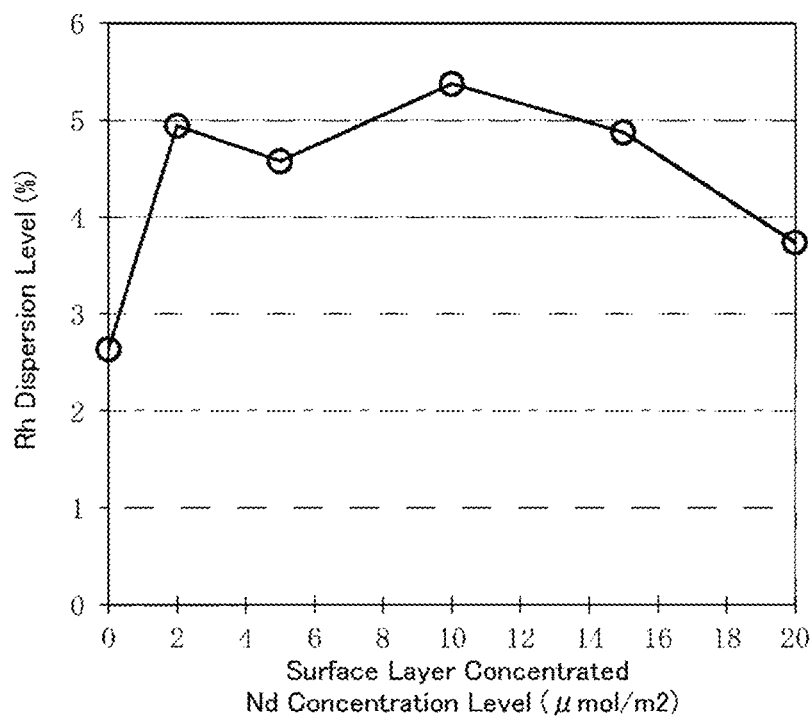
FIG. 3 shows the relationship between Rh dispersion and the concentration level of surface layer concentrated Nd on lanthanum-stabilized alumina oxide after endurance testing of the exhaust gas purification catalyst of Example 6.

As shown in FIG. 2 and FIG. 3, in the catalysts of both Examples 5 and 6, when the concentration level of neodymium concentrated in the surface layer of the composite oxide or the lanthanum stabilized aluminum oxide was 1 µmol/m$^2$ to 20 µmol/m$^2$, and in particular, when 2 µmol/m$^2$ to 15 µmol/m$^2$, the rhodium particle dispersion level after endurance testing improved. That is, it is understood that, irrespective of the kind of oxide, when the concentration level of the neodymium concentrated in the surface layer of the oxide is 1 µmol/m$^2$ to 20 µmol/m$^2$, and in particular when 2 µmol/m$^2$ to 15 µmol/m$^2$, the rhodium particle dispersion level after endurance testing improves.

It can be said that the activity and high-temperature endurance of the catalyst improves due to the improved rhodium particle dispersion level after endurance testing.

Catalyst Performance Testing:

Catalyst performance testing was performed on the catalysts in Examples 1-6 and Comparative Examples 1 and 2 after hydrothermal redox endurance testing mentioned above under the following conditions using a simulated exhaust gas having the composition shown in Table 2.

In the catalyst performance testing, the temperature at which 50% of each of the HC, CO, and NOx components was purified was evaluated. It can be said that the lower the temperature at which 50% was purified, is the better the performance as an exhaust gas purification catalyst.

In the catalyst performance testing, the gas flow rate was set at a spatial velocity of 100,000/hr, the temperature was raised from 100° C. to 400° C. at a rate of 25° C./min, the gas composition after passing through the catalyst was analyzed using an AO-2020 (manufactured by ABB), and the purification rate was measured.

TABLE 2

| $C_3H_6$ (ppm) | CO (%) | $H_2$ (%) | NOx (ppm) | $O_2$ (%) | $CO_2$ (%) | $H_2O$ (%) | $N_2$ |
|---|---|---|---|---|---|---|---|
| 430 | 0.6 | 0.2 | 1000 | 0.6 | 15 | 10 | Balance |

Figure 4:
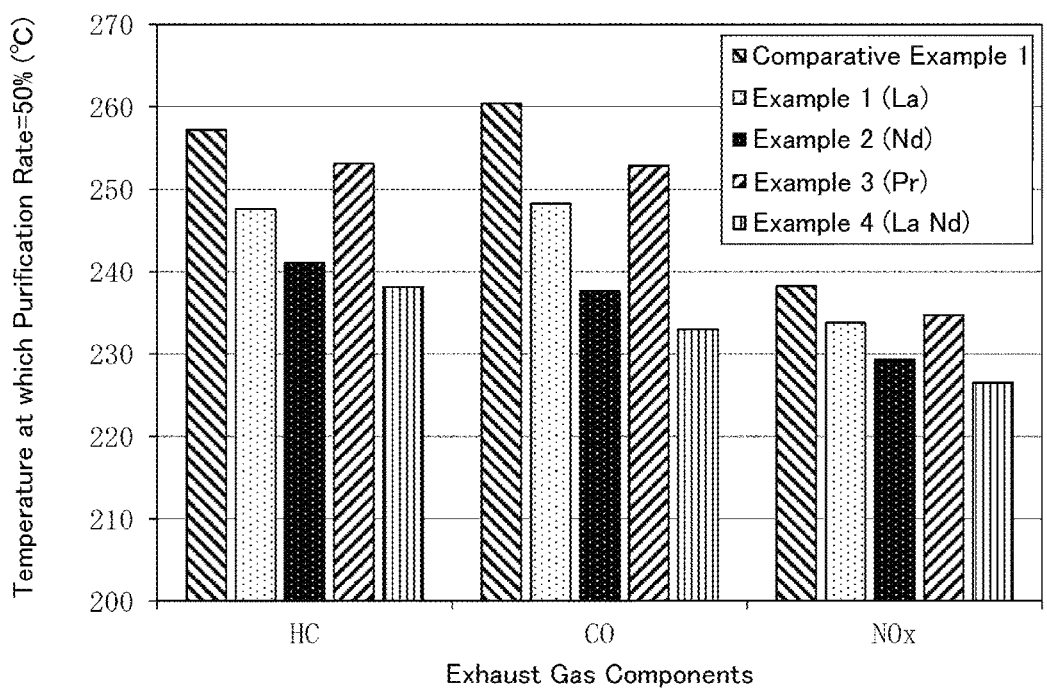
FIG. 4 shows the relationship between exhaust gas components and the purification rates in catalyst evaluation testing of the exhaust gas purification catalysts of Examples 1-4 and Comparative Example 1.

As shown in FIG. 4, compared to the catalyst of Comparative Example 1, the temperature at which 50% of each component of all of the HC, CO, and $NO_x$ components was purified was low in all of the catalysts in Examples 1-4.

That is, irrespective of the kind of rare earth element, it is understood that by concentrating a rare earth element on the surface layer of the composite oxide, catalyst performance after endurance testing was improved. This is believed to be because by concentrating a rare earth element on the surface layer of the composite oxide, rhodium aggregation is suppressed and rhodium dispersion level after endurance testing improved. In particular, when neodymium was concentrated on the surface layer of the composite oxide (Example 2), and when lanthanum and neodymium were concentrated on the surface layer of the composite oxide (Example 4), the effect of improved catalyst performance was high.

Figure 5:
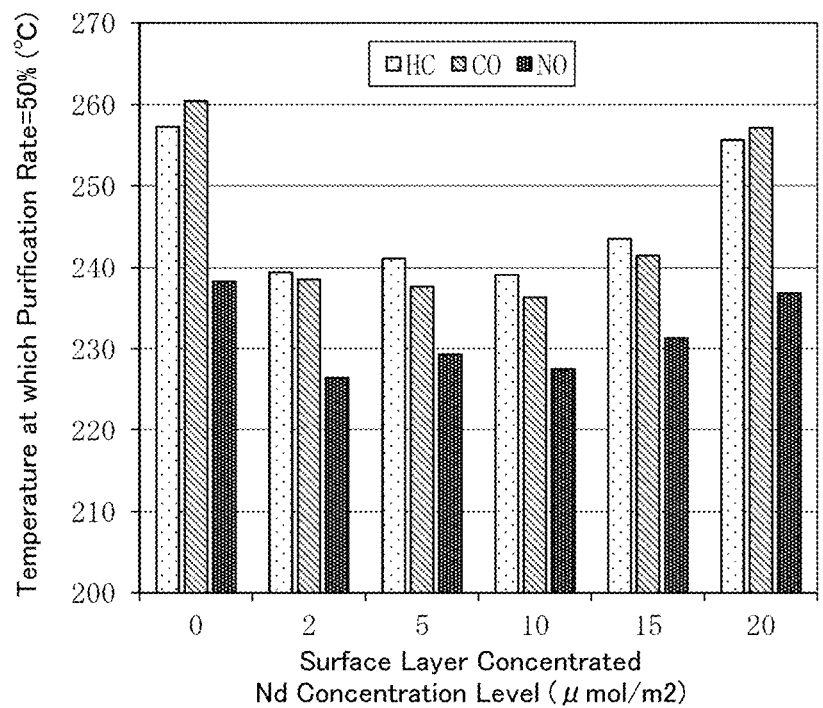
FIG. 5 shows the relationship between Nd concentration level on the on ceria-zirconia composite oxide surface layer and the purification rate of the exhaust gas components in catalyst evaluation testing of the exhaust gas purification catalyst of Example 5.
Figure 6:
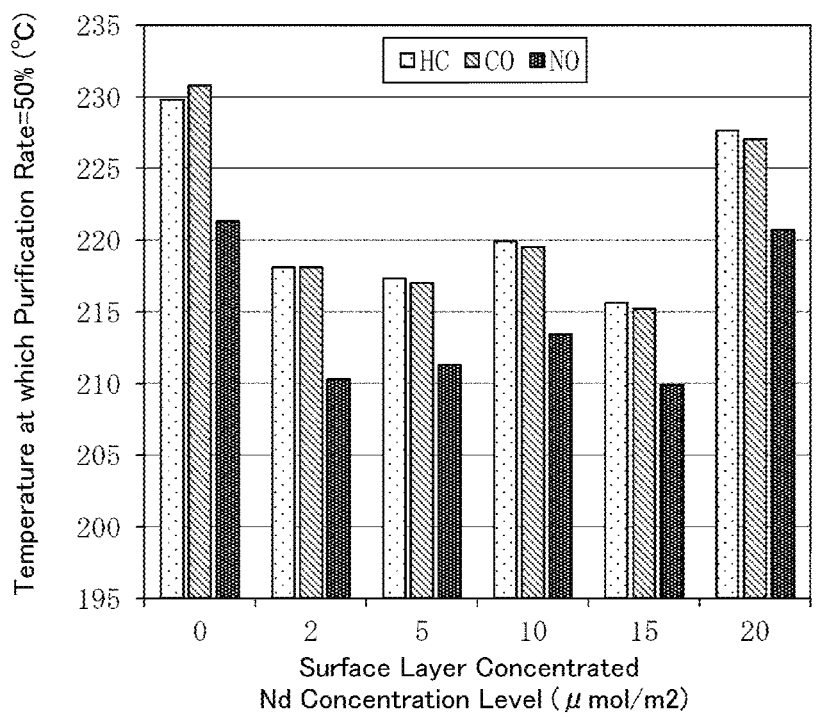
FIG. 6 shows the relationship between Nd concentration level on the on lanthanum-stabilized alumina oxide surface layer and the purification rate of the exhaust gas components in catalyst evaluation testing of the exhaust gas purification catalyst of Example 6.

As shown in FIG. 5 and FIG. 6, in the catalysts of Examples 5 and 6, when the concentration level of neodymium concentrated on the surface layer of the composite oxide or the lanthanum stabilized aluminum oxide was 2 $\mu mol/m^2$, 5 $\mu mol/m^2$, 10 $\mu mol/m^2$, 15 $\mu mol/m^2$, 20 $\mu mol/m^2$, and, in particular, remarkably when 2 $\mu mol/m^2$ to 15 $\mu mol/m^2$, the temperature at which 50% of each component of all of the HC, CO, and $NO_x$ components was purified was low compared to when neodymium was concentrated at 0 $\mu mol/m^2$.

That is, irrespective of the kind of oxide, it is understood that, when the concentration level of the neodymium concentrated in the surface layer of the oxide is 2 $\mu mol/m^2$ to 20 $\mu mol/m^2$, and in particular when 2 $\mu mol/m^2$ to 15 $\mu mol/m^2$, the performance of the catalyst improved.

In order to observe the form, after hydrothermal redox endurance testing, of the rare earth element and the supported rhodium on the surface layer of the oxide, the exhaust gas purification catalysts of Example 5, in which the Nd concentration levels on the oxide surface layer were 10 $\mu mol/m^2$ and 20 $\mu mol/m^2$, was observed using a scanning transmission electron microscope (Titan G2-cubed; manufactured by FEI Company).

Figure 7:
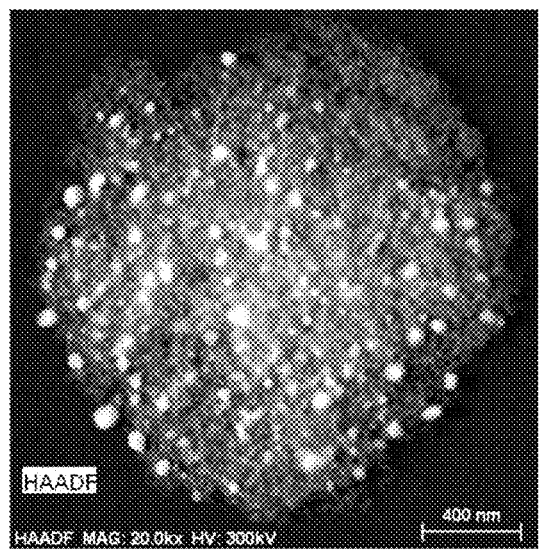
FIG. 7 is an electron micrograph showing the form of the Rh after hydrothermal redox endurance testing of the exhaust gas purification catalyst of Example 6 in which the Nd concentration level on the oxide surface layer is 10 $\mu mol/m^2$.
Figure 8:
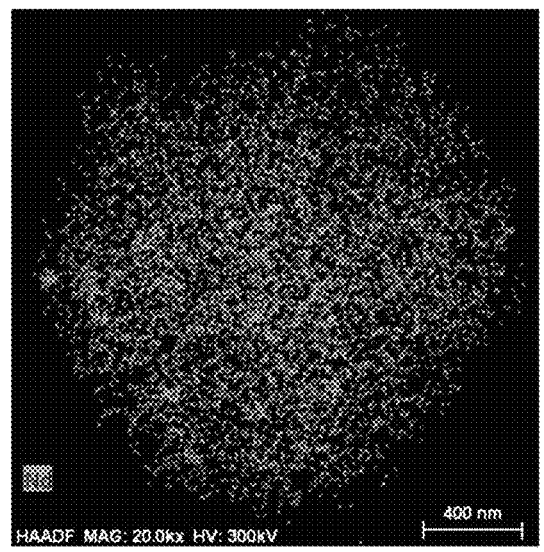
FIG. 8 is an electron micrograph showing the form of the Nd after hydrothermal redox endurance testing of the exhaust gas purification catalyst of Example 6 in which the Nd concentration level on the oxide surface layer is 10 $\mu mol/m^2$.

As shown in FIG. 7, it is understood that in the exhaust gas purification catalyst of Example 5, in which the Nd concentration level on the oxide surface layer is 10 $\mu mol/m^2$, even after hydrothermal redox endurance testing, rhodium particles having a particle diameter of 50 nm or less are present with a high dispersion level. Further, as shown in FIG. 8, it is understood that neodymium is also present with a high dispersion level on the lanthanum stabilized aluminum oxide.

Figure 9:
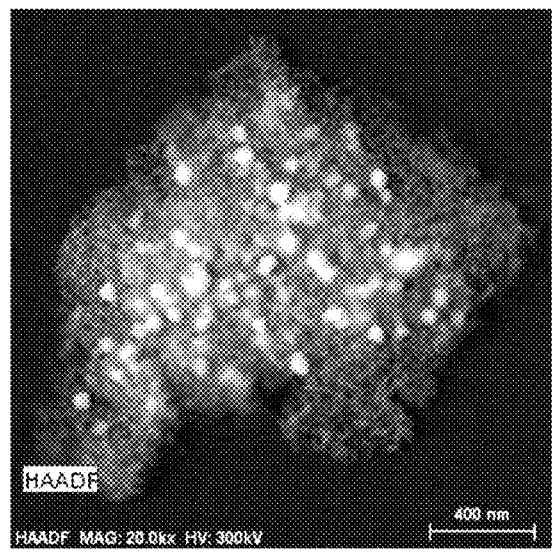
FIG. 9 is an electron micrograph showing the form of the Rh after hydrothermal redox endurance testing of the exhaust gas purification catalyst of Example 6 in which the Nd concentration level on the oxide surface layer 20 $\mu mol/m^2$.
Figure 10:
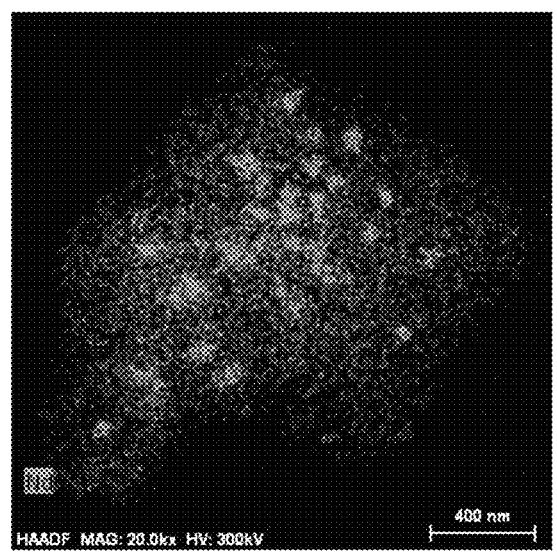
FIG. 10 is an electron micrograph showing the form of the Nd after hydrothermal redox endurance testing of the exhaust gas purification catalyst of Example 6 in which the Nd concentration level on the oxide surface layer 20 $\mu mol/m^2$.

Meanwhile, as shown in FIG. 9, in the exhaust gas purification catalyst of Example 5, in which the Nd concentration level on the oxide surface layer is 20 $\mu mol/m^2$, rhodium particles having a particle diameter of 50 nm and more are present in great numbers. It is believed that the rhodium particles having a particle diameter of 50 nm and more are caused by the particle diameter becoming larger due to aggregation of rhodium particles during endurance testing. As shown in FIG. 10, it is understood that neodymium also aggregated in the same way that rhodium particles did. It is believed that particle diameter increased due to neodymium particles moving and colliding/associating with each other during endurance testing, and that the frequency of collisions/associations is remarkable at concentrations of 20 $\mu mol/m^2$ and above.

Vehicle Testing:

Comparative Example 3 and Example 7 were evaluated on a commercial vehicle with a 1.5 litre engine and the total gaseous emissions of HC, NMHC, CO, and NOx were measured at the position of post-catalyst. The catalysts had undergone engine-bench aging with fuel cut aging cycles and a peak temperature of 950° C. for 75 hours. The harshness of the engine-bench ageing is similar to that of hydrothermal redox aging at 1000° C. for 20 hours as mentioned above.

As shown in Table 3, Example 7 showed improved performance on emission reduction especially for $NO_x$ while maintaining comparable performance on HC, NMHC, and CO emission reduction, in compared with Comparative Example 3.

TABLE 3

Catalysts Performance by Bag Emission Analysis

| | Weighted Tailpipe Emissions (g/km) | | | |
|---|---|---|---|---|
| | HC | NMHC | CO/10 | $NO_x$ |
| Comparative Example 3 | 0.024 | 0.018 | 0.010 | 0.023 |
| Example 7 | 0.024 | 0.018 | 0.010 | 0.019 |

We claim:

1. A catalyst article for treating exhaust gas comprising: a substrate; and
a catalytic region on the substrate;
wherein the catalytic region comprises a platinum group metal (PGM) component, an oxide, and a rare earth metal component;
wherein the oxide is an inorganic oxide, an oxygen storage component (OSC) material, or a mixture thereof;
wherein the rare earth metal component concentration by element on the surface of the oxide per unit specific surface area of the oxide is 1 $\mu mol/m^2$ to 20 $\mu mol/m^2$; and
wherein the rare earth metal component comprises Nd.

2. The catalyst article of claim 1, wherein the rare earth metal component concentration by element on the surface of the oxide per unit specific surface area of the oxide is 2 $\mu mol/m^2$ to 15 $\mu mol/m_2$.

3. The catalyst article of claim 1, wherein the PGM component is selected from the group consisting of platinum, palladium, rhodium, and a mixture thereof.

4. The catalyst article of claim 3, wherein the PGM component is rhodium.

5. The catalyst article of claim 1, wherein the PGM loading is ranged from 0.1-10 wt. %, based on the total weight of the catalytic region.

6. The catalyst article of claim 1, wherein the oxide is the OSC material.

7. The catalyst article of claim 6, wherein the OSC material is selected from the group consisting of cerium oxide, a ceria-zirconia mixed oxide, a ceria-zirconia composite oxide, a composite oxide comprising Ce, Zr, and a rare earth element, and an alumina-ceria-zirconia mixed oxide.

8. The catalyst article of claim 7, wherein the rare earth element in the composite oxide is La and/or Y.

9. The catalyst article of claim 6, wherein the PGM dispersion is at least 2% after aging at 1000° C. for 20 hours under redox conditions when the PGM loading is at least 1%, based on the total weight of the catalytic region.

10. The catalyst article of claim 6, wherein the PGM dispersion is at least 6% after aging at 1000° C. for 20 hours under redox conditions when the PGM loading is less than 1%, based on the total weight of the catalytic region.

11. The catalyst article of claim 1, wherein the oxide is the inorganic oxide.

12. The catalyst article of claim 11, wherein the inorganic oxide is selected from the group consisting of alumina, lanthanide-stabilized alumina, alkaline earth stabilized alumina, silica, aluminosilicates, a magnesia/alumina composite oxide, titania, niobia, tantalum oxides, neodymium oxide, yttrium oxide, lanthanides, and mixed oxides or composite oxides thereof.

13. The catalyst article of claim 12, wherein the inorganic oxide is alumina, a lanthanide-stabilized alumina, or a magnesia/alumina composite oxide.

14. The catalyst article of claim 11, wherein the PGM dispersion is at least 3% after aging at 1000° C. for 20 hours under redox conditions when the PGM loading is at least 1%, based on the total weight of the catalytic region.

15. The catalyst article of claim 1, wherein the catalytic region further comprises an alkali or alkali earth material.

16. The catalyst article of claim 15, wherein the alkali or alkali earth metal is barium or strontium.

17. The catalyst article of claim 1, wherein the PGM component is supported on the surface layer of the oxide.

18. The catalyst article of claim 1, wherein the catalyst article further comprises a second catalytic region.

19. An emission treatment system for treating a flow of a combustion exhaust gas comprising the catalyst article of claim 1.

20. The catalyst article of claim 1, wherein the rare earth metal component further comprises La.

* * * * *